Figure 1:
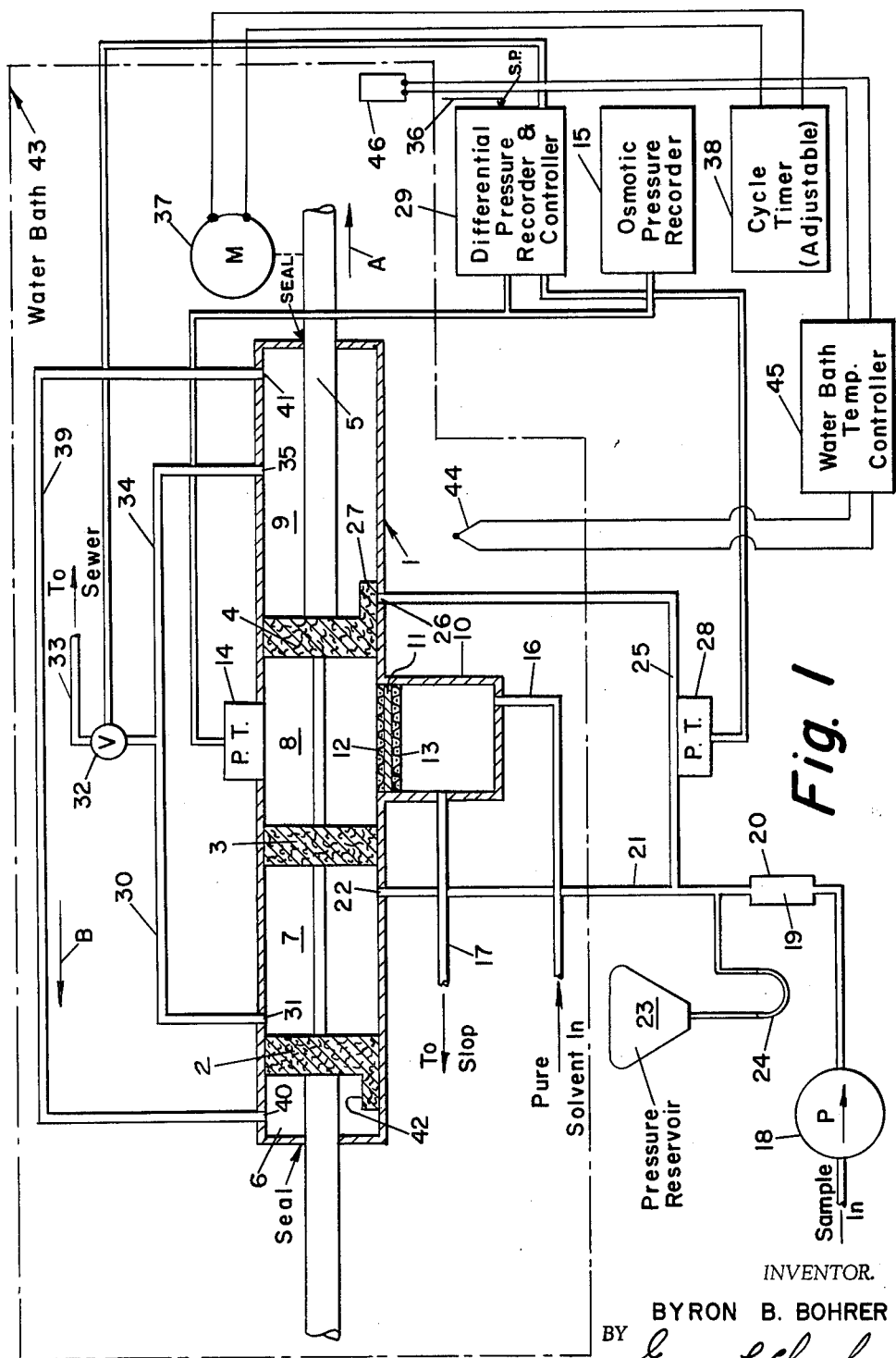

May 3, 1966

B. B. BOHRER 3,248,932

OSMOMETER

Filed May 15, 1963

2 Sheets-Sheet 1

INVENTOR.
BYRON B. BOHRER
BY George L. Church
ATTORNEY

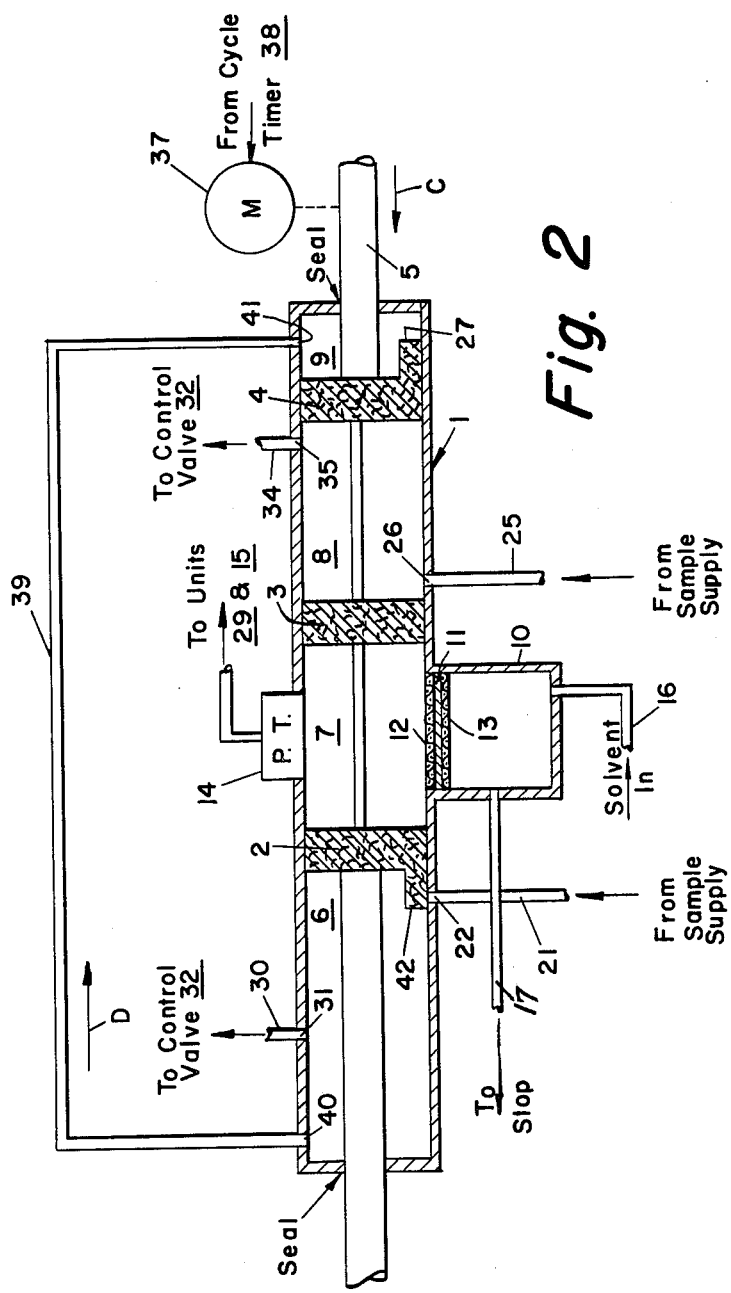

United States Patent Office 3,248,932
Patented May 3, 1966

3,248,932
OSMOMETER
Byron B. Bohrer, Rosemont, Pa., assignor to Sun Oil Company, Philadelphia, Pa., a corporation of New Jersey
Filed May 15, 1963, Ser. No. 280,668
6 Claims. (Cl. 73—53)

This invention relates to an osmometer (which is a device for measuring osmotic pressure), and more particularly to an automatic osmometer which operates repetitively, i.e. in semi-continuous fashion.

In the past, osmotic pressure has normally been determined by measurement of the height of a column of liquid (e.g., in a manometer) coupled to an osmotic cell, when the liquid solution in the cell is at equilibrium with a pure solvent on the opposite side of a semipermeable membrane. Such height measurement can be converted to an observation of the pressure developed as a result of entry of solvent into the solution through the membrane. However, this scheme has drawbacks. It is a batch measurement and it is very time-consuming; the liquid builds up to fill the column must first diffuse through the membrane, and this is a very slow process.

In the device of the present invention, very little pure solvent needs to pass through the diffusion barrier (membrane) in order for equilibrium to be reached. Equilibrium is thus reached rapidly, with the result that a rapid pressure determination may be made for each sample. Then, a series of samples may be measured one after another, quite rapidly; a close approach to continuous osmotic pressure measurement is thus provided. Such a semi-continuous osmotic pressure indication is useful, for example, in a fermentation process, wherein changes in the osmotic pressure provide a gross indication of the formation of undesired by-products.

As previously stated, in order to obtain a rapid measurement of the osmotic pressure, the amount of material diffusing through the barrier or membrane must be held to a minimum. According to this invention, the osmotic cell is held at constant volume. If this is done, the pressure will rise rapidly with only a small amount of diffusion, since liquids are considered substantially incompressible. The time required to reach equilibrium may be determined, and a new sample taken (and measured) on a timed basis as soon as equilibrium has been reached with the previous sample.

Further according to this invention, the sample system pressure is balanced against the osmotic pressure, in order to speed the approach to equilibrium. Therefore, the pressure of the sample is already close to equilibrium, and even less diffusion through the membrane is required. This further increases the rapidity of measurement.

An osmometer that analyzes a rapid succession of samples quickly (which may be termed a semi-continuous osmometer) closely approaches a continuous type of device.

A detailed description of the invention follows, taken in conjunction with the accompanying drawings, wherein:

FIG. 1 is a schematic representation of an osmometer aparatus according to this invention, the reciprocating element being shown in one of its two operating positions; and FIG. 2 is a partial view, generally similar to FIG. 1 but showing the reciprocating element in the other of its two operating positions.

Refer first to FIG. 1. At the heart of the osmometer of the invention is a container 1, in the form of a hollow cylinder, in which are mounted for reciprocal movement three spaced pistons 2, 3 and 4. Pistons 2, 3, and 4 are made of a suitable sealing material such that they all form seals around their peripheries with the inner cylindrical wall of container 1. Pistons 2–4 are coupled together in fixed spaced relationship by means of a rigid longitudinally-extending piston rod 5 whose opposite ends extend through respective seals at the ends of container 1; the pistons 2–4 thus reciprocate together, as a unit, when rod 5 is reciprocated. The space inside container 1 is separated by the pistons 2–4 into four volumes 6, 7, 8, and 9. Volume 6 is located between piston 2 and the adjacent (or left-hand) end of container 1; it may be seen that this volume varies in size as piston 2 moves back and forth. Next in line is volume 7, which is located between pistons 2 and 3; this volume is fixed in size, but varies in its location (with respect to container 1) as pistons 2 and 3 together move back and forth. Next is volume 8, which is equal to volume 7 and is located between pistons 3 and 4; this volume is also fixed in size but varies in its location (with respect to the container) as pistons 3 and 4 together move back and forth. Finally, volume 9 is located between piston 4 and the adjacent (or right-hand) end of container 1; this volume varies in size as piston 4 moves back and forth. As illustrated in FIG. 1, the piston rod 5 may be reduced in diameter between pistons 2 and 3 and also between pistons 3 and 4, so as to maximize the portions of volumes 7 and 8 that are available for a liquid.

The central portion of the length of the interior of container 1 is established as a test zone. In the piston position of FIG. 1, volume 8 is positioned in this zone, while in the piston position of FIG. 2, volume 7 has been conveyed to this zone. Since volumes 7 and 8 are equal to each other, it may be seen that the central test zone is of constant (pre-established and fixed) volume.

A chamber 10 is mounted at the aforementioned test zone, and one end of this chamber is coupled to the test zone, as by means of an opening in the container wall, into which opening the chamber 10 is sealed. At said one end of chamber 10, there is an osmotic (semipermeable) membrane 11 which is held in position between a pair of foraminous supports 12 and 13 (indicated as screening). Thus, one face (to wit, the upper face) of membrane 11 is exposed to the interior of container 1, and the other face (to wit, the lower face) of this membrane is exposed to the interior of chamber 10.

If chamber 10 contains a pure solvent, while volume 8 (in FIG. 1) is filled with a solution (sample) utilizing this same solvent, osmotic pressure will cause the pure solvent to diffuse through the membrane 11, increasing the pressure in the sample volume 8, until the sample and the solvent reach a state of equilibrium. In FIG. 1, the pressure in volume 8 when equilibrium is reached corresponds to the osmotic pressure of the sample.

A pressure transducer 14 is mounted at the aforesaid test zone, and this transducer is coupled to the test zone (as by means of a diaphragm, not shown) in such a way as to enable measurement of the pressure in the test zone of the container. In FIG. 1, the pressure in volume 8 is being measured, since in the position of FIG. 1 volume 8 has been conveyed to the test zone portion of the container. The output of pressure transducer 14 is fed in the form of a suitable signal to the input of an osmotic pressure recorder 15. Recorder 15 records a trace which represents the pressure in the test zone of container 1 (as measured by pressure transducer 14).

During operation of the osmometer of the invention, pure solvent, at about atmospheric pressure, is supplied continuously to chamber 10 by way of a pipe or conduit 16. By way of a discharge pipe 17 which leads to a slop connection, the pure solvent chamber 10 is flushed continuously, and any contaminated solvent (which may have become contaminated as a result of reverse flow through membrane 11) is transferred to slop; it may be seen that the discharge or slop pipe 17 is coupled to chamber 10 near the membrane 11.

A sample of a solution being investigated, which solution conventionally has as its solvent component the same solvent supplied to chamber 10, is fed to a pump 18, which is capable of developing a superatmospheric pressure. Pump 18 pumps the liquid sample through a body of mercury 19 in a container 20 (the elements 19 and 20 thus forming a mercury seal) to a conduit 21, whose upper end is sealed into an opening 22 in container 1. In the piston position of FIG. 1, the opening 22 communicates with volume 7.

A pressure reservoir 23, which contains a suitable pressurized gas, communicates with conduit 21 through a mercury seal contained in a U-shaped manometer tube 24. The purpose of reservoir 23 is to smooth out pulsations of pressure which might tend to appear in conduit 21, particularly if pump 18 is of the reciprocating type.

One end of a branch conduit 25 is coupled to conduit 21, and the upper end of conduit 25 is sealed into an opening 26 in container 1. The piston 4 has an integral extension 27 which, in the piston position of FIG. 1, covers and seals off opening 26 from the interior of the container. However, in another piston position to be described hereinafter, wherein extension 27 no longer seals opening 26, liquid sample can be pumped by way of conduit 25 into the interior of container 1.

A pressure transducer 28 is coupled to the conduit 25 (as by means of a diaphragm, not shown) in such a way as to enable measurement of the sample pressure, in the sample conduits 21 and 25. The output of pressure transducer 28 is fed in the form of a suitable signal to one input of a differential pressure recorder and controller 29. The output of pressure transducer 14 is also fed to another input of unit 29, which latter will be referred to further hereinafter.

One end of a conduit 30 is sealed into an opening 31 in container 1. In the piston position of FIG. 1, the opening 31 communicates with volume 7. Conduit 30 leads to one side of a pressure control valve 32, and from the other side of this valve a conduit 33 extends to a sewer, into which the spent sample may be discharged. One end of a conduit 34 is sealed into an opening 35 in container 1. In the piston position of FIG. 1, the opening 35 communicates with volume 9, but in the other piston position this opening communicates with volume 8. Conduit 34 is coupled in parallel with conduit 30 to the inlet side of valve 32.

The differential pressure recorder and controller 29 receives inputs from pressure transducers 14 and 28, as previously stated. The output of unit 29 is applied to the pressure control valve 32. The controller 29 has a set point adjustment, as indicated at 36. Controller 29 differentially compares the sample pressure (as measured by transducer 28) with the pressure in the test zone (as measured by transducer 14), and produces a control output which controls valve 32 in such a way as to maintain a preset (as set by an adjustment at 36) pressure differential (e.g., a differential of 2%) between the sample pressure and the pressure in the osmotic cell (test zone). In other words, the controller adjusts the sample pressure automatically (by means of the control valve 32) so that it is 2% less than the pressure in the osmotic cell (test zone).

When the apparatus has a piston position illustrated in FIG. 1, several events are occurring simultaneously. (1) Sample is being pumped into the system by way of conduit 21 and is flushing out the volume 7, by way of conduit 30 and valve 32. In this connection, it may be noted that valve 32 has been opened by controller 29 at this time because of a high pressure in volume 7 as a result of the previous osmotic pressure measurement in this volume. (2) The sample pressure is being adjusted automatically (by means of control valve 32) so that it is 2% less than the pressure in the osmotic cell (test zone, which is volume 8 at this time). (3) Pure solvent is flowing by way of conduit 16 to the standard side (solvent side) 10 of the osmotic cell, and flushing any contaminated solvent out by way of slop pipe 17. (4) Pure solvent is diffusing through the membrane 11 into the constant volume 8 and increasing the pressure at transducer 14 until equilibrium is reached. Since volume 8 is a constant volume, and since the pressure of the fresh (previously prepared) liquid sample therein has previously been adjusted to within 2% of the final or equilibrium sample pressure, the pressure at transducer 14 rises rapidly with only a small amount of diffusion through the barrier (membrane) 11. This means that equilibrium is reached almost immediately.

The pressure recorder 15 records the pressure at transducer 14, i.e., the pressure in the osmotic cell or test zone (which is volume 8 in FIG. 1). The pressure existing in volume 8, upon the sample and the solvent reaching a state of equilibrium, is the maximum pressure measured in the test zone, and is the osmotic pressure of the solution being investigated. Thus, the recorder 15, by means of its chart, provides a record of osmotic pressure, the successive osmotic pressure values corresponding to the successive maximums on this chart.

As previously stated, pressured liquid (whose pressure is very close to that in the osmotic cell) is present in volume 7, in the piston position of FIG. 1. Also, pressured liquid is maintained in volumes 6 and 9, the pressure here also being very close to the pressure in the osmotic cell. Then, since the pressure on all sides of the osmotic cell is very close to the pressure in the osmotic cell, any tendency of the latter to leak is reduced. This is an important feature of the invention.

An electric motor 37, which is sealed with respect to a water bath to be later described, is mechanically coupled to piston rod 5 to reciprocate or move the same back and forth, from the position of FIG. 1 to the position of FIG. 2, then back again to the position of FIG. 1 and so on, in a repetitive manner. The energization of this motor is controlled by a cycle timer 38, the length of whose cycle is adjustable and is adjusted for each feed to the device, based on the length of time required to reach equilibrium, as shown by recorder 15. Since equilibrium is approached asymptotically, the cycle time is set so as to give a practical reading (on recorder 15) useful for describing the osmotic pressure under changing osmotic pressure conditions. When the preset timer 38 operates, motor 37 moves the piston rod 5 in the direction of the arrow A in FIG. 1, thereby to shift both volumes 7 and 8 to the right, to the position of FIG. 2. In order to permit this shift, an equalizer line 39 is provided, one end of this line communicating with volume 6 by means of an opening 40 (which is adjacent the left-hand end of container 1), and the other end of this line communicating with volume 9 by means of an opening 41 (which is adjacent the right-hand end of container 1). The ends of line 39 are sealed into the respective openings 40 and 41. When the piston rod 5 moves in the direction of arrow A, liquid flows from volume 9 to volume 6 through the line 39, in the direction of arrow B. This enables the piston rod and pistons to move freely to the right.

Assuming that the osmometer initially has the piston position illustrated in FIG. 1, when motor 37 operates it moves the piston rod in the direction of arrow A until it reaches the position illustrated in FIG. 2. During this movement, as just described, liquid flow takes place through line 39, in the direction of arrow B. FIG. 2 is a simplified showing, from which parts already described in connection with FIG. 1 (and which do not change) have been omitted.

Very shortly after piston rod 5 begins to move to the right (in the direction of arrow A), from the position of FIG. 1, piston 2 reaches a position such as to block off or seal opening 31. This in effect interrupts the sample flushing path through volume 7, cutting off the flow through conduit 21. This prevents any further change in volume 7, and allows the new sample (which was in FIG. 1 being prepared in volume 7) to be conveyed to the constant volume test zone. Once piston 2 has reached opening 31, the connection between conduits 21 and 30 remains broken, as piston rod 5 continues to move to the right, toward the position of FIG. 2.

In FIG. 2, volumes 7 and 8 have been shifted to the right, such that the new sample (which was being supplied to volume 7 in FIG. 1) is conveyed to the constant volume test zone, adjacent osmotic membrane 11 and pressure transducer 14. Thus, volume 7 now functions as part of the osmotic cell.

The piston 2 has an integral extension 42 which, in the piston position of FIG. 2, covers and seals off opening 22 from the interior of the container; in FIG. 1, of course, extension 42 does not seal opening 22. In FIG. 2, extension 27 of piston 4 does not seal opening 26; liquid sample can now be pumped by way of conduit 25 into the interior of container 1, and specifically into volume 8 thereof. In FIG. 2, opening 26 communicates with volume 8.

In the piston position of FIG. 2, events similar to those previously described in connection with FIG. 1 are occurring simultaneously, but now they are occurring to the opposite volumes. These events will now be particularized. (1) Sample is being pumped into the system by way of conduit 25, and is flushing out the volume 8, by way of conduit 34 and valve 32. Valve 32 has been opened by controller 29 at this time because of the high pressure in volume 8 as a result of the previous osmotic pressure measurement (described in connection with FIG. 1) in this volume. (2) The sample pressure is being adjusted automatically so that it is 2% less than the pressure in the osmotic cell (test zone, which is volume 7 at this time). (3) Pure solvent is flowing by way of conduit 16 to the standard side of the osmotic cell, and flushing any contaminated solvent out by way of slop pipe 17. (4) Pure solvent is diffusing through the membrane 11 into the constant volume 7 and increasing the pressure at transducer 14 until equilibrium is reached. As previously described in connection with FIG. 1, equilibrium is reached almost immediately, with only a small amount of diffusion through the membrane 11.

As before, recorder 15 records the pressure at transducer 14, the pressure in the osmotic cell or test zone (which is volume 7 in FIG. 2). The pressure at equilibrium is the osmotic pressure of the solution being investigated. In FIG. 2, a new measurement of osmotic pressure is made, this following or succeeding the measurement of FIG. 1 and utilizing the fresh sample in volume 7, which volume has in FIG. 2 been conveyed to the test zone. The fresh sample is supplied to volume 7 when in the FIG. 1 position, as previously described.

As soon as equilibrium has been reached in the position of FIG. 2, the preset timer 38 again operates, causing motor 37 to move piston rod 5 in the direction of the arrow C in FIG. 2, thereby to shift both volumes 7 and 8 back to the left, to the position of FIG. 1. When piston rod 5 moves in the direction of arrow C, liquid flows from volume 6 to volume 9 through the line 39, in the direction of arrow D. This enables the piston rod and pistons to move freely to the left.

Very shortly after piston rod 5 begins to move to the left (in the direction of arrow C), from the position of FIG. 2, piston 4 reaches a position such as to block off or seal opening 35. This in effect interrupts the sample flushing path through volume 8, cutting off the flow through conduit 25. This prevents any further change in volume 8, and allows the new sample (which was in FIG. 2 being prepared in volume 8) to be conveyed to the constant volume test zone. Once piston 4 has reached opening 35, the connection between conduits 25 and 34 remains broken, as piston rod 5 continues to move to the left, back toward the position of FIG. 1.

When the volumes 7 and 8 have been shifted back to the left, a new measurement of osmotic pressure is made in the manner first described herein, using volume 8 as the osmotic cell, with the fresh sample therein; it will be realized that this fresh sample is suppled to volume 8 when in the FIG. 2 position.

It has previously been described how, in both FIG. 1 and FIG. 2, equilibrium is reached rapidly, measuring time from the instant when the reciprocator shifts the device from the position of FIG. 1 to that of FIG. 2, or vice versa. This means that cycle timer 38 can be adjusted to cause the device to take a rapid series of samples and a corresponding rapid series of osmotic pressure measurements. By way of example, a new sample may be taken about every ten minutes. Close approach to continuous osmotic pressure indication is thus effected, and the device of this invention may be termed a semi-continuous osmometer.

In order to remove the effects of temperature as a variable, the osmometer is completely immersed in a constant temperature (e.g., water) bath 43, as indicated by the dot-dash outline in FIG. 1. In order to control the temperature of this bath, to thereby keep such temperature substantially constant, the temperature of the water is sensed by means of a thermocouple 44 immersed in the bath, the output of this thermocouple being fed to the input of a water bath temperature controller 45 whose output in turn controls the heating effect of an electric heater 46 (e.g., a cartridge heater) in the bath. The controller 45 operates (by means of heater 46 controlled thereby) to maintain the temperature of the water bath 43 (as sensed by thermocouple 44) substantially constant. As a result, variations in outside or ambient temperature have no effect on the measurement of osmotic pressure made by the osmometer of this invention.

The invention claimed is:

1. In an osmometer, a single container, a plurality of spaced partitions mounted for unitary movement within said container and disposed in sealed relationship to the walls of said container, the spaces between adjacent partitions providing two sealed chambers which are movable with respect to the container walls; means for moving said partitions to bring said chambers alternatively to a portion of said container established as a test zone, means for supply to each chamber, prior to its movement to said portion of said container, a sample of a solution being investigated, a chamber having at one end thereof a semipermeable membrane communicating with said portion of said container; means for supplying the pure solvent liquid component of said solution to said last-mentioned chamber, and means for measuring the pressure in said portion of said container.

2. Combination in accordance with claim 1, including also cycle timing means for actuating said partition moving means to bring one chamber into the test zone at the end of a preset time interval beginning with the bringing into the test zone of the other chamber.

3. Combination as defined in claim 2, wherein said time interval is slightly in excess of the time required for the sample and solvent to reach a state of equilibrium.

4. Combination as defined in claim 1, wherein the pressure existing in said portion of said container, upon the sample and the solvent reaching a state of equilibrium, is recorded as the osmotic pressure of said sample.

5. Combination in accordance with claim 1, wherein said first-mentioned supplying means includes pressurizing means for creating a superatmospheric pressure in each sealed chamber, prior to its movement to said portion of said container.

6. Combination as defined in claim 5, wherein the pressurizing means operates automatically to create a pressure close to the maximum pressure measured in the test zone portion of said container.

References Cited by the Examiner

UNITED STATES PATENTS

| 2,540,377 | 2/1951 | Pachaly | 73—53 |
| 3,063,288 | 11/1962 | Reiff | 73—53 |
| 3,162,050 | 12/1964 | McDonald et al. | 73—422 |

FOREIGN PATENTS 669,342  12/1938  Germany.

DAVID SCHONBERG, *Primary Examiner.*